United States Patent
Chang et al.

(10) Patent No.: US 10,990,140 B2
(45) Date of Patent: Apr. 27, 2021

(54) TOUCHPAD DEVICE

(71) Applicant: Chicony Electronics Co., Ltd., New Taipei (TW)

(72) Inventors: Chia-Wei Chang, New Taipei (TW); Yi-Long Hsieh, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 0 days.

(21) Appl. No.: 16/231,948

(22) Filed: Dec. 25, 2018

(65) Prior Publication Data

US 2020/0026325 A1 Jan. 23, 2020

(30) Foreign Application Priority Data

Jul. 19, 2018 (TW) .................................. 107125008

(51) Int. Cl.
*G06F 1/16* (2006.01)
*G06F 3/0354* (2013.01)

(52) U.S. Cl.
CPC ............ *G06F 1/169* (2013.01); *G06F 1/1656* (2013.01); *G06F 3/03547* (2013.01)

(58) Field of Classification Search
CPC .............................. G06F 3/03547; G06F 1/169
See application file for complete search history.

(56) References Cited

U.S. PATENT DOCUMENTS

| | | | |
|---|---|---|---|
| 2007/0139388 A1* | 6/2007 | Lee ........................ | G06F 1/1616 345/173 |
| 2016/0147328 A1* | 5/2016 | Doi ......................... | G06F 1/169 345/157 |
| 2017/0090593 A1* | 3/2017 | Cao ........................ | G06F 3/0414 |

FOREIGN PATENT DOCUMENTS

TW M291184 U 5/2006

* cited by examiner

*Primary Examiner* — Kent W Chang
*Assistant Examiner* — Chayce R Bibbee
(74) *Attorney, Agent, or Firm* — CKC & Partners Co., LLC (57) ABSTRACT

A touchpad device is fixed to a chassis. The touchpad device includes a base plate. The base plate is fixed to the chassis. The base plate includes a body portion and fixed portions. The body portion has holes. Each of the fixed portions is connected to the body portion and extends into a corresponding one of the holes. Each of the fixed portions includes a fixed segment and at least one connecting arm. The fixed segment is fixed to the chassis. The connecting arm is connected between the fixed segment and the body portion.

10 Claims, 8 Drawing Sheets

TOUCHPAD DEVICE

RELATED APPLICATIONS

This application claims priority to Taiwan Application Serial Number 107125008, filed Jul. 19, 2018, which is herein incorporated by reference.

BACKGROUND

Technical Field

The present disclosure relates to a touchpad device.

Description of Related Art

With the advance of technology, a touchpad device has been widely applied on notebooks, tablets, personal digital assistants, or other portable electronic products. A movement of the cursor is synchronized with a movement of the user's finger through the touchpad device. Therefore, the touchpad device is often used to replace a mouse as an input device or an operating device.

In a conventional touchpad device, a touchpad is fixed to a chassis of a computer by means of a screw. However, inevitably, some deformation occurs to the chassis during a manufacturing process of the chassis. For example, two sides of the chassis may be warped upward or downward relative to a middle part of the chassis, or have S-shape deformation.

The foregoing deformation of the chassis may cause a base plate of the touchpad device to be deformed as the touchpad device is fixed to the chassis. In this way, a gap between a circuit board of the touchpad device and the base plate is reduced, thus affecting a pressing operation of the touchpad device.

SUMMARY

Accordingly, an aspect of the disclosure is to provide a touchpad device that prevents a base plate from being deformed with a deformed chassis, and prevents a gap between a circuit board and a base plate from being reduced.

According to an embodiment of the disclosure, the touchpad device fixed to a chassis includes a base plate. The base plate includes a body portion and fixed portions. The body portion has holes. Each of the fixed portions is connected to the body portion and extends into a corresponding one of the holes. Each of the fixed portions includes a fixed segment and at least one connecting arm. The fixed segment is fixed to the chassis. The connecting arm is connected between the fixed segment and the body portion.

In an embodiment of the disclosure, the touchpad device further includes a fastening element. The fixed segment has a fastening hole. The fastening element passes through the fastening hole to fasten the fixed segment to the chassis.

In an embodiment of the disclosure, the connecting arm is inclined relative to the fixed segment and the body portion.

In an embodiment of the disclosure, a number of the connecting arm is plural. The connecting arms surround the fixed segment.

In an embodiment of the disclosure, a number of the holes is two. The two holes are disposed at two opposite sides of the fixed segment respectively.

In an embodiment of the disclosure, the holes surround the fixed segment.

In an embodiment of the disclosure, the base plate further has a reinforcing structure. The reinforcing structure is connected to the body portion of the base plate and extends along a direction parallel to the body portion.

In an embodiment of the disclosure, the reinforcing structure is a convex hull. The convex hull is integral with the body portion of the base plate.

In an embodiment of the disclosure, the fixed portions are arranged along a longer side edge of the base plate. The base plate further has a through hole. The reinforcing structure is disposed between the through hole and the fixed portions.

In an embodiment of the disclosure, the chassis further has a through area. The touchpad device further includes a supporting element, a circuit board, and a substrate. The supporting element abuts against the base plate. The circuit board abuts against a side of the supporting element located away from the base plate. The substrate abuts against a side of the circuit board located away from the supporting element. The substrate is accommodated in the through area of the chassis.

Accordingly, in the present disclosure, the base plate of the touchpad device has holes for allowing each of the fixed portions of the base plate extends into the corresponding one of the holes. Through the above configuration, when the base plate is fixed to the chassis, only the fixed portion of the base plate is bent upward or downward along with a deformation of the chassis, but the body portion of the base plate is still flat. In this way, a gap between the circuit board and the body portion of the base plate will not be reduced due to the deformation of the chassis, thereby ensuring the pressing operation at a corner of the touchpad device to be operated normally.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
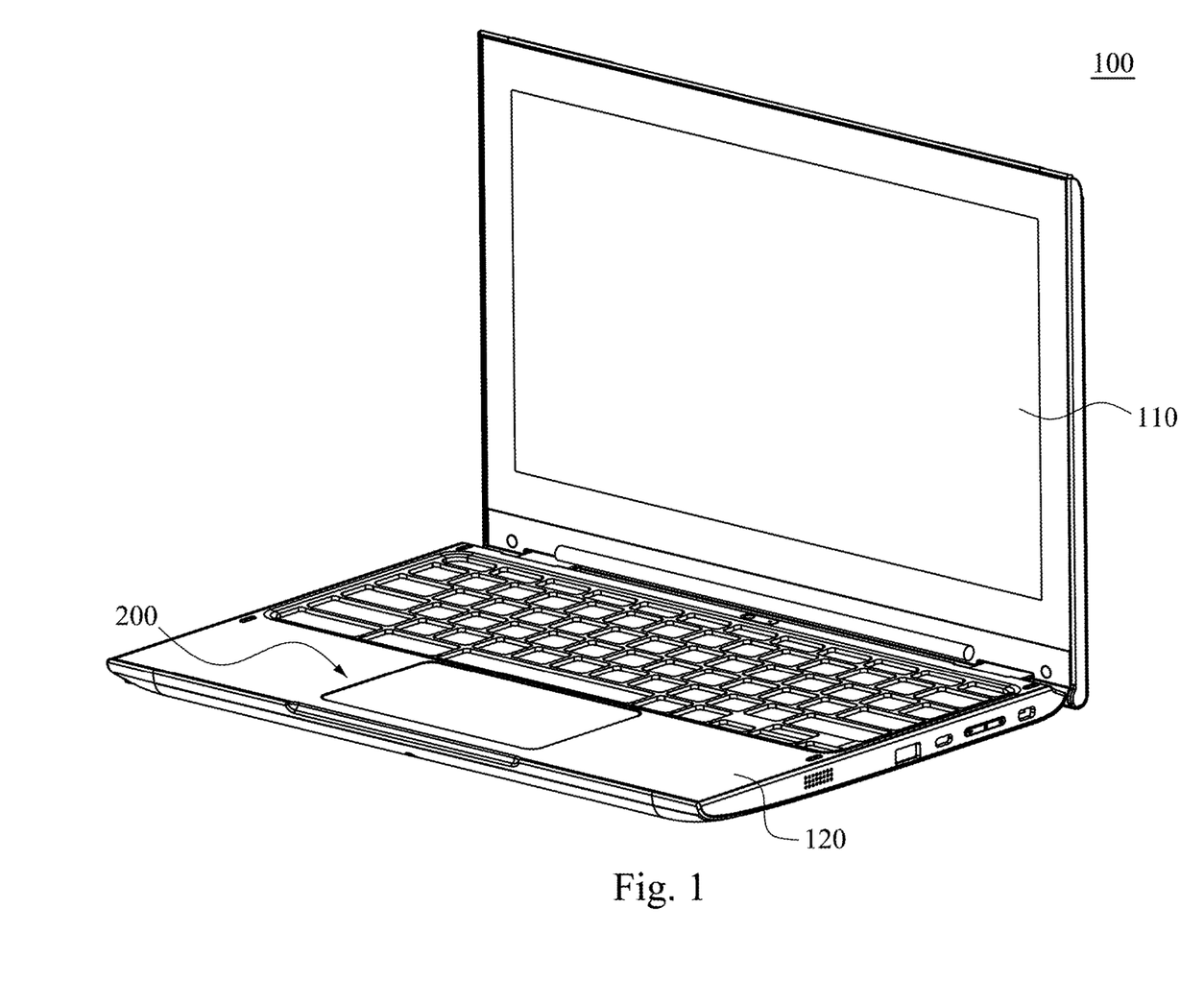
FIG. 1 is a perspective view of a computer including a touchpad device according to an embodiment of the disclosure.

Reference is made to FIG. 1. FIG. 1 is a perspective view of a computer 100 including a touchpad device 200 according to an embodiment of the disclosure. As shown in FIG. 1, the computer 100 includes a screen 110 and a host 120. The touchpad device 200 of the present embodiment is an input device disposed on the host 120 of the computer 100, or on an electronic product including a touch panel used as an input device or an operating device (e.g., a personal digital assistant), but the disclosure is not limited in this regard. That is, the touchpad device 200 can be used in any electronic product that adopts the touch panel to be an input device or an operating device.

Figure 2:
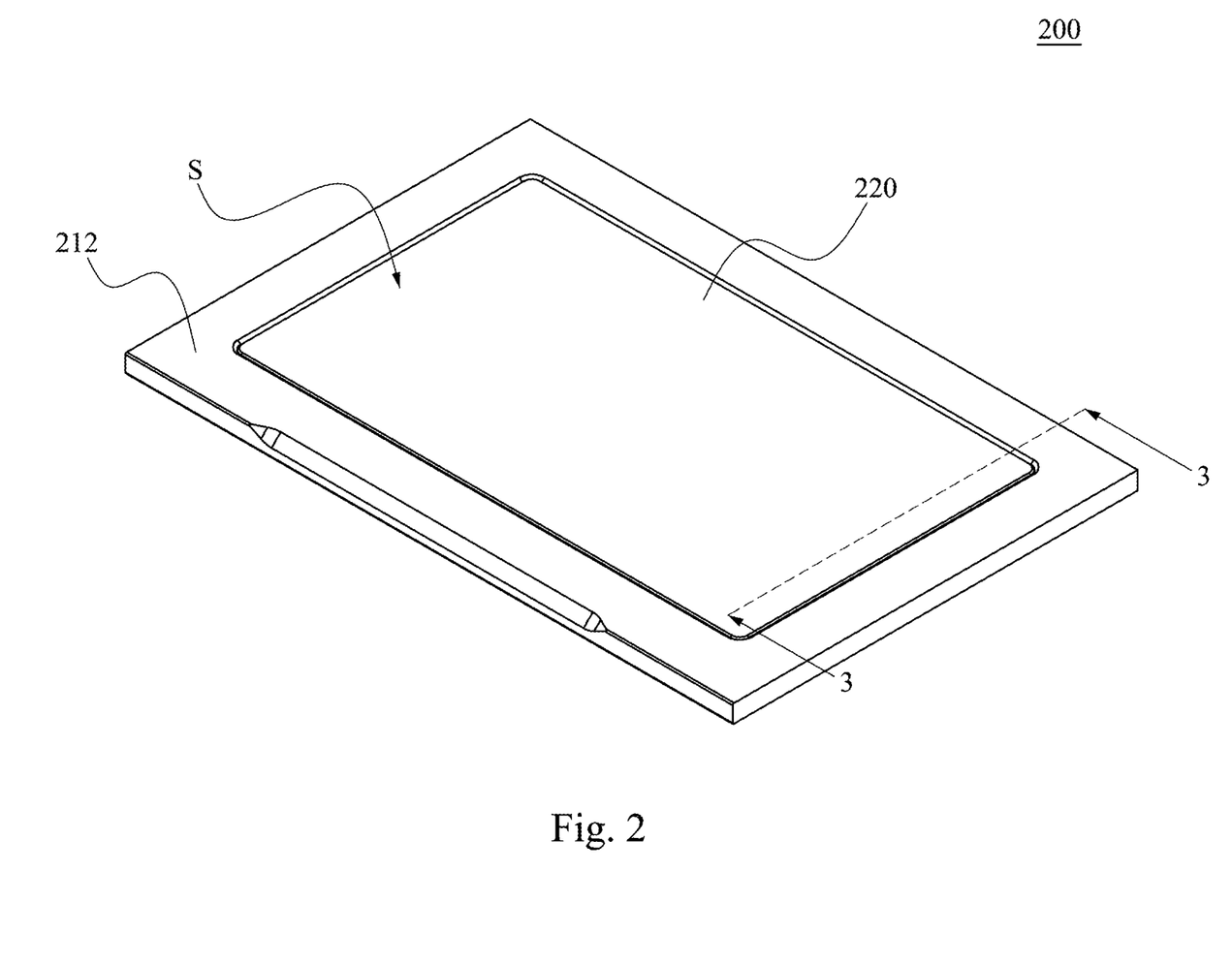
FIG. 2 is a perspective view of the touchpad device in FIG. 1.
Figure 3:
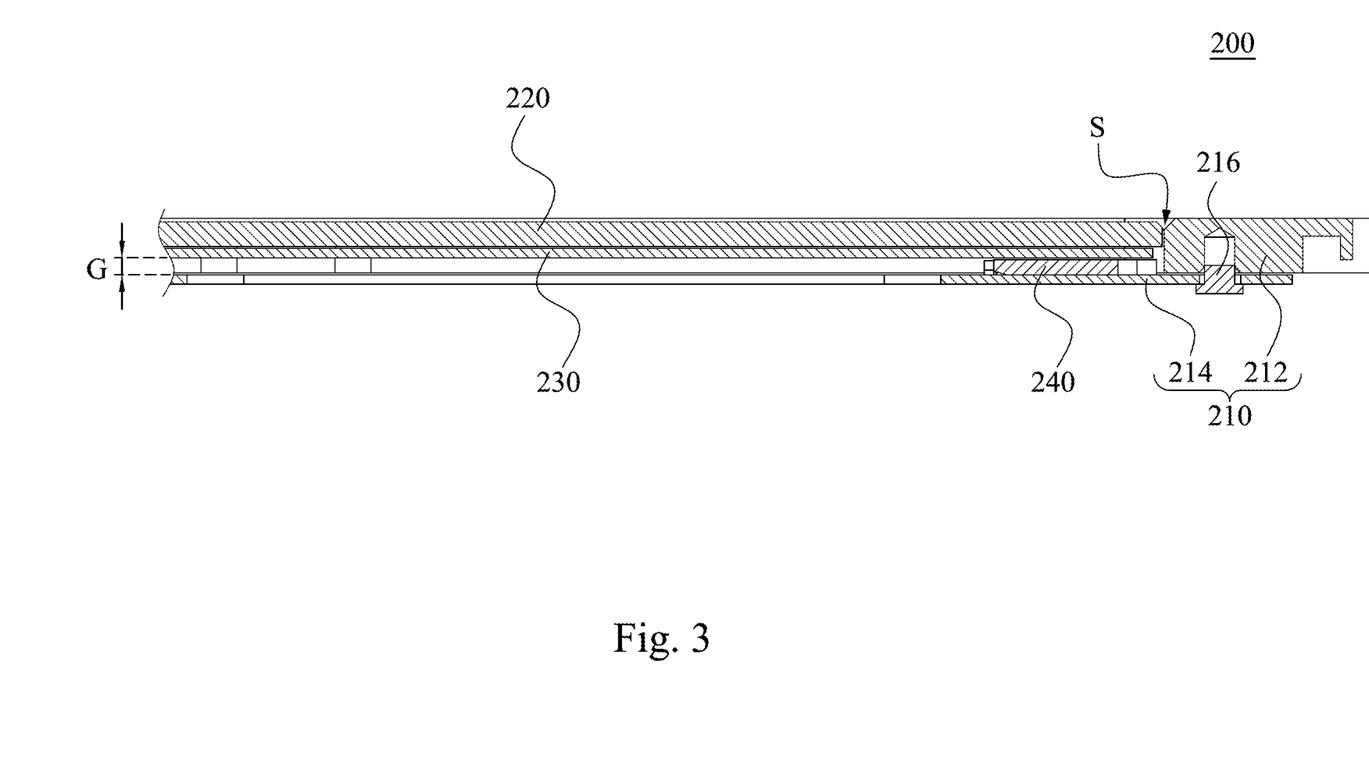
FIG. 3 is a cross-sectional view of the touchpad device taken along line 3-3 in FIG. 2.

Reference is made to FIGS. 2 and 3. FIG. 2 is a perspective view of the touchpad device 200 in FIG. 1. FIG. 3 is a cross-sectional view of the touchpad device 200 taken along line 3-3 in FIG. 2. As shown in FIGS. 2 and 3, in the present embodiment, the touchpad device 200 includes a base plate 214, a supporting element 240, a circuit board 230, and a substrate 220. The touchpad device 200 is fixed to a chassis 212. In some embodiments, the chassis 212 is a portion of a casing of the host 120 (e.g., an upper casing), but the disclosure is not limited in this regard. The chassis 212 has a through area S. The substrate 220 is accommodated in the through area S of the chassis 212.

As shown in FIG. 3, the supporting element 240 abuts against the base plate 214. The circuit board 230 abuts against a side of the supporting element 240 located away from the base plate 214. The substrate 220 abuts against a side of the circuit board 230 located away from the supporting element 240. Furthermore, the supporting element 240 abuts between the circuit board 230 and the base plate 214. The supporting element 240 is configured to be elastically deformed to move the circuit board 230 and the substrate 220 relative to the base plate 214 when the substrate 220 is pressed.

In some embodiments, the supporting element 240 is made of a material with good elasticity, for example, a metal elastic piece, but the disclosure is not limited in this regard.

Furthermore, there is a gap G between the circuit board 230 and the base plate 214 without the supporting element 240. The gap G is a distance for allowing the substrate 220 and the circuit board 230 to move relative to the base plate 214 when the substrate 220 is pressed. The distance for allowing the substrate 220 and the circuit board 230 to move relative to the base plate 214 is longer if the distance of the gap G is longer. On the other hand, the distance for allowing the substrate 220 and the circuit board 230 to move relative to the base plate 214 is shorter if the distance of the gap G is shorter.

Figure 4:
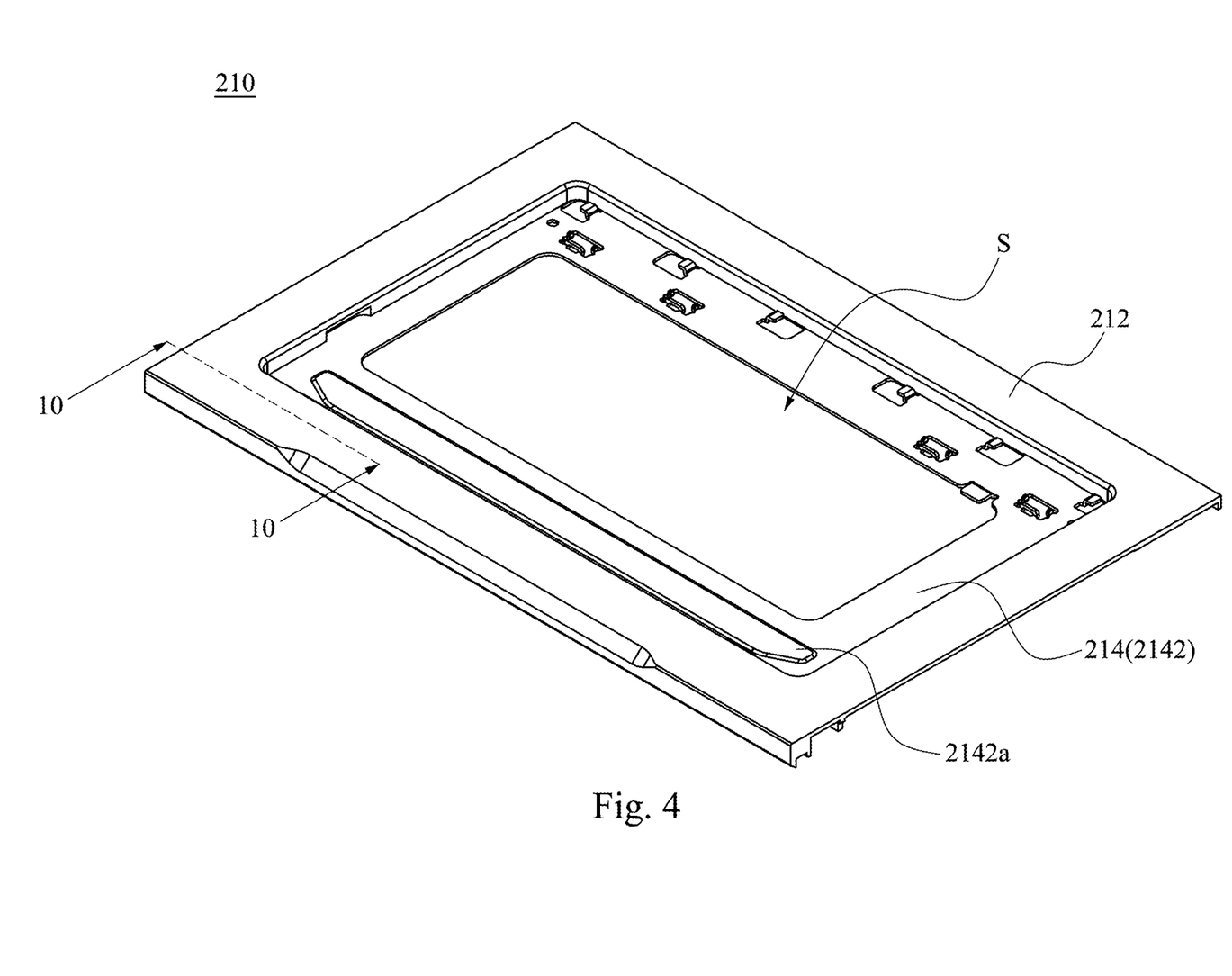
FIG. 4 is a perspective view of a base plate and a chassis according to an embodiment of the disclosure.
Figure 5:
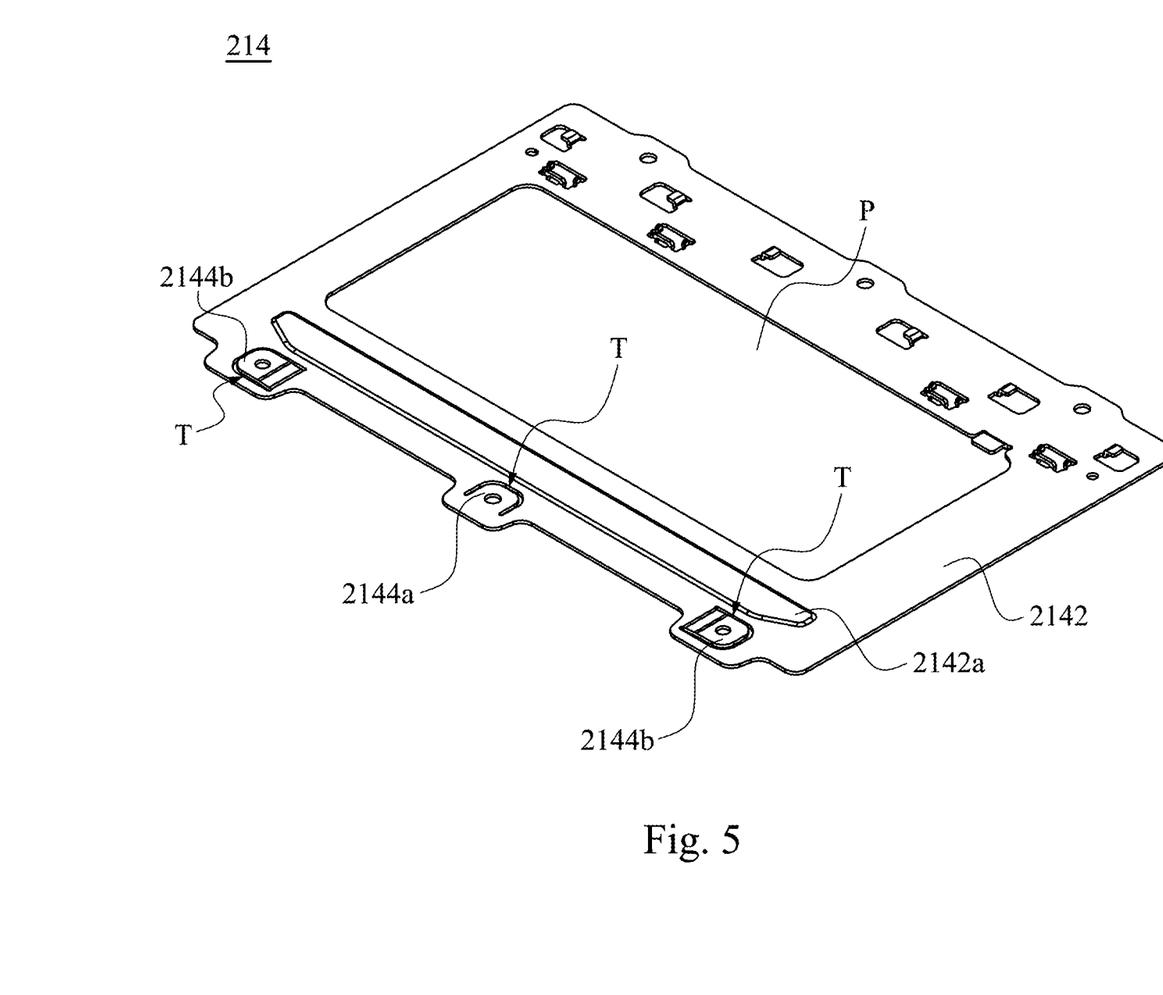
FIG. 5 is a perspective view of the base plate in FIG. 4.

Reference is made to FIGS. 4 and 5. FIG. 4 is a perspective view of the base plate 214 and the chassis 212 according to an embodiment of the disclosure. FIG. 5 is a perspective view of the base plate 214 in FIG. 4. As shown in FIG. 4, in an embodiment of the disclosure, the chassis 212 covers above the base plate 214. As shown in FIG. 5, the base plate 214 includes a body portion 2142, fixed portions 2144a and 2144b, and a through hole P. In some embodiments, the fixed portions 2144a and 2144b are arranged along a longer side edge of the base plate 214, but the disclosure is not limited in this regard. The body portion 2142 has holes T. Each of the fixed portions 2144a and 2144b is connected to the body portion 2142 and extends into a corresponding one of the holes T. The chassis 212 is fixed to the base plate 214 through the fixed portions 2144a and 2144b. The manner of fixing between the fixed portions 2144a and 2144b and the chassis 212 will be described in detail below.

Figure 6:
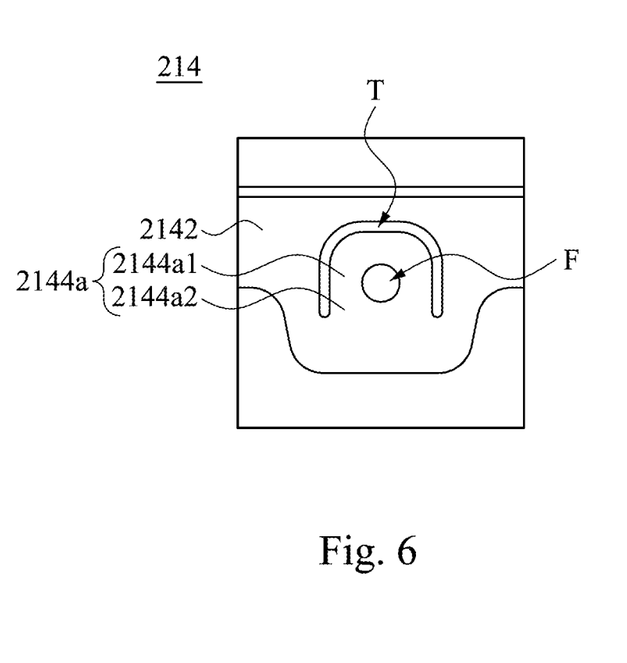
FIG. 6 is a perspective view of a fixed portion and a hole of the base plate in FIG. 5.

Reference is made to FIG. 6. FIG. 6 is a perspective view of the fixed portion 2144a and the hole T of the base plate 214 in FIG. 5. As shown in FIG. 6, the fixed portion 2144a includes a fastening hole F. The fastening hole F is configured to allow a fastening member to pass through. The fixed portion 2144a is connected with the body portion 2142 of the base plate 214 and extends into the corresponding one of the holes T. That is, the hole T surrounds the periphery of the fixed portion 2144a and forms a C-shape. Both ends of the hole T extend towards the connection of the fixed portion 2144a and the body portion 2142. However, the shape and number of the hole T are not limited to the embodiment as shown in FIG. 6. The shape and number of the hole T can be adjusted according to actual needs.

Furthermore, the fixed portion 2144a includes a fixed segment 2144a1 and a connecting arm 2144a2. The fixed segment 2144a1 extends into the hole T and has the aforementioned fastening hole F. The connecting arm 2144a2 is connected between the fixed segment 2144a1 and the body portion 2142 as a cantilever. The fixed segment 2144a1 of the fixed portion 2144a is fixed to the chassis 212 when the base plate 214 is fixed to the chassis 212. The connecting arm 2144a2 connected between the fixed segment 2144a1 and the body portion 2142 is deformed and bent along with the deformation of the chassis 212. Therefore, when the base plate 214 is fixed to the chassis 212, only the fixed portion 2144a of the base plate 214 is deformed upward or downward along with the deformation of the chassis 212. The body portion 2142 of the base plate 214 still remains flat.

Figure 7A:
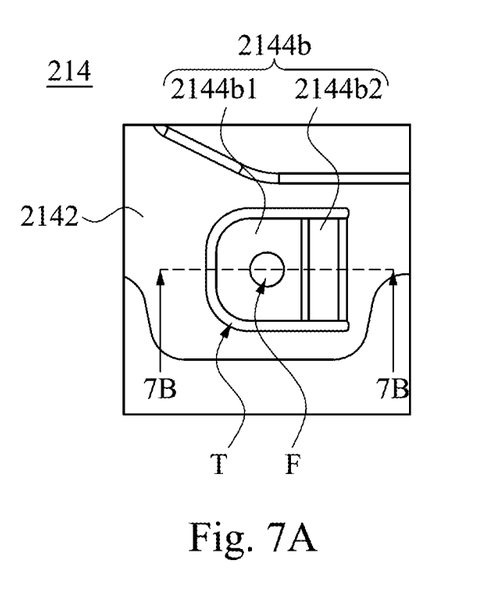
FIG. 7A is a perspective view of another fixed portion and another hole of the base plate in FIG. 5.
Figure 7B:
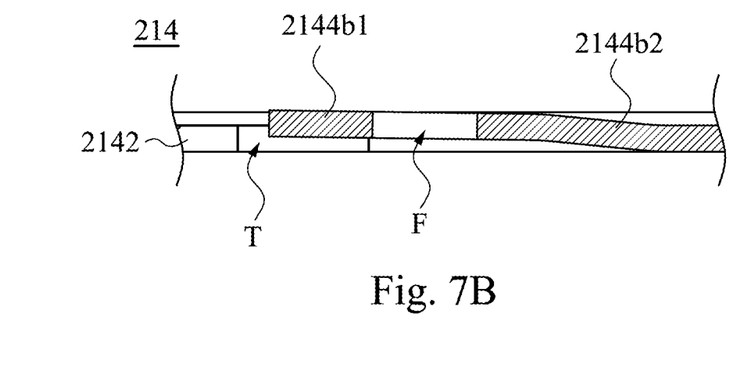
FIG. 7B is a cross-sectional view of the base plate taken along line 7B-7B in FIG. 7A.
Figure 10:
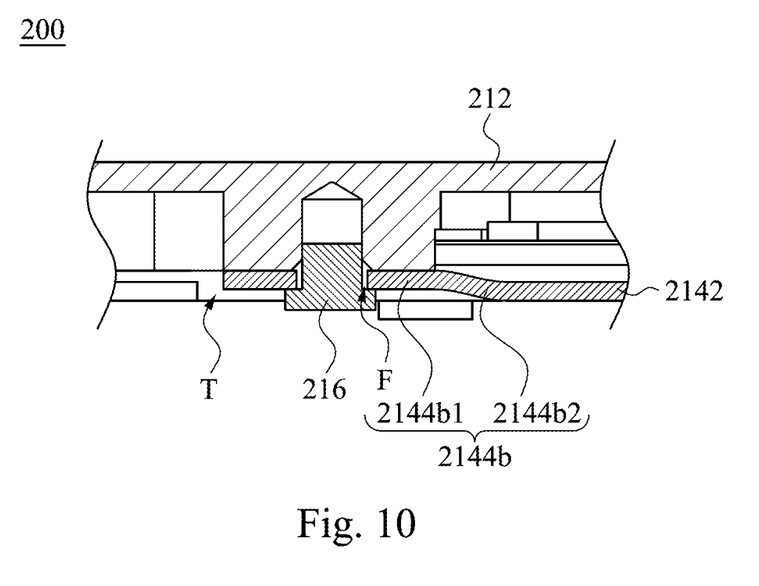
FIG. 10 is a cross-sectional view of the base plate and the chassis taken along line 10-10 in FIG. 4.

Reference is made to FIGS. 7A and 7B. FIG. 7A is a perspective view of the fixed portion 2144b and the hole T of the base plate 214 in FIG. 5. FIG. 7B is a cross-sectional view of the base plate 214 taken along line 7B-7B in FIG. 7A. The hole T of the present embodiment is similar to that of the embodiment of the FIG. 6, and thus is not described again herein. Compared with the embodiment of FIG. 6, the connecting arm 2144b2 is connected between the fixed segment 2144b1 and the body portion 2142 and is inclined relative to the fixed segment 2144b1 and the body portion 2142, as shown in FIG. 7B. In more detail, the connecting arm 2144b2 is inclined relative to the body portion 2142 in the direction towards the chassis 212 (as shown in FIG. 10), but the disclosure is not limited in this regard.

As shown in the embodiments of FIGS. 7A and 7B, if the deformation of the chassis 212 is too large for the base plate 214 to be fixed to the chassis 212 in flat, the fixed segment 2144b1 can get closer to the chassis 212 through the inclined configuration of the connecting arm 2144b2. In this way, even if the chassis 212 is deformed, when the base plate 214 is fixed to the chassis 212, only the fixed portion 2144b of the base plate 214 is deformed upward or downward along with the deformation of the chassis 212, and the body portion 2142 of the base plate 214 still remains flat.

Figure 8:
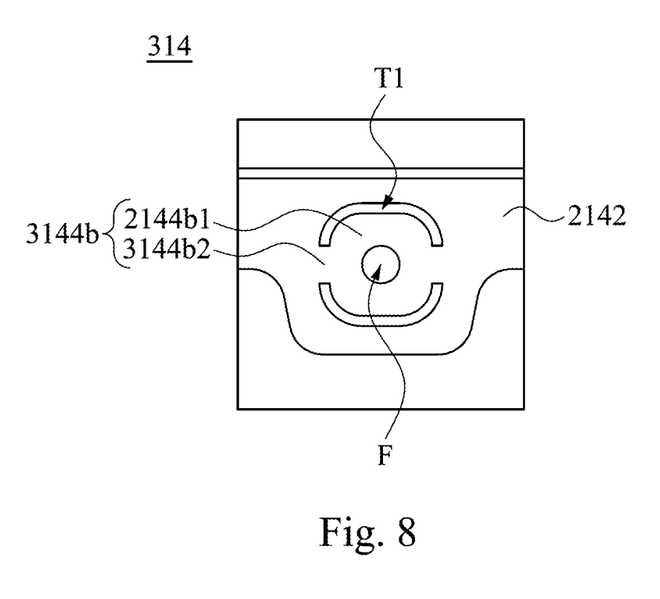
FIG. 8 is a perspective view of a fixed portion and holes according to another embodiment of the disclosure, wherein a number of the holes is two.

Reference is made to FIG. 8. FIG. 8 is a perspective view of a fixed portion 3144b and holes T1 of the base plate 314 according to another embodiment of the disclosure, in which a number of the holes T1 is two. The fixed segment 2144b1 of the present embodiment is similar to that of the embodiment in FIG. 7A, and thus is not described again herein. Compared with the embodiment of FIG. 7A, the number of the holes T1 is two, and the number of the connecting arms 3144b2 is two. The two holes (only one of the holes T1 is labeled in FIG. 8) are disposed at two opposite sides of the fixed segment 2144b1 respectively. The two connecting arms 3144b2 (only one of the connecting arms 3144b2 is labeled in FIG. 8) are respectively disposed between two corresponding ends of the two holes T1, and are connected between the fixed segment 2144b1 and the body portion 2142 of the base plate 314.

Figure 9:
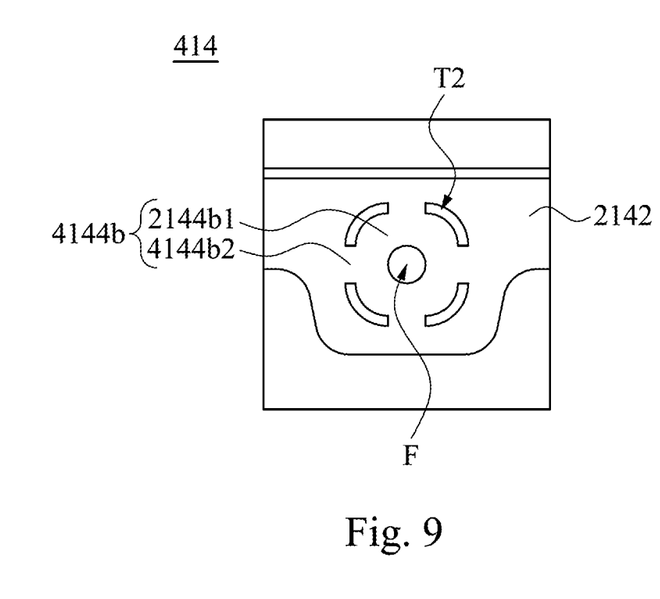
FIG. 9 is a perspective view of a fixed portion and holes according to another embodiment of the disclosure, wherein a number of the holes is four.

Reference is made to FIG. 9. FIG. 9 is a perspective view of a fixed portion 4144b of the base plate 414 and holes T2 according to another embodiment of the disclosure, in which a number of the holes T2 is four. The fixed segment 2144b1 of the present embodiment is similar to that of the embodiment in FIG. 7A, and thus is not described again herein. Compared with the embodiment of FIG. 7A, the number of the holes T2 is four, and the number of connecting arms 4144b2 is four. The four holes T2 (only one of the holes T2 is labeled in FIG. 9) are disposed around the fixed segment 2144b1. The four connecting arms (only one of the connecting arms 4144b2 is labeled in FIG. 9) are respectively disposed between any two of the holes T2 and disposed around the fixed segment 2144b1.

In the above two embodiments, the connecting arms 3144b2 and 4144b2 are horizontally connected between the body portion 2142 and the fixed segment 2144b1 relative to the body portion 2142 and the fixed segment 2144b1. In some embodiments, the connecting arms 3144b2 and 4144b2 are inclined relative to the body portion 2142 and the fixed segment 2144b1, similar to the connecting arm 2144b2 of the embodiments in FIGS. 7A and 7B, but the disclosure is not limited in this regard.

In some embodiments, the shapes and numbers of the holes T1 and T2 are not limited to the embodiments in FIGS. 8 and 9. The shapes and the numbers of the holes T1 and T2 can be adjusted according to actual needs.

Reference is made to FIG. 10. FIG. 10 is a cross-sectional view of the base plate 214 and the chassis 212 taken along line 10-10 in FIG. 4. The fixed portion 2144b shown in FIG. 10 is the fixed portion 2144b of the embodiments shown in FIGS. 7A and 7B. However, it should be understood that the following embodiments disclosed in the present disclosure can also be referred to the following related description.

As shown in FIG. 10, the touchpad device 200 further includes a fastening element 216. The fixed segment 2144b1 of the fixed portion 2144b has the fastening hole F. The fastening element 216 passes through the fastening hole F to fasten the fixed segment 2144b1 to the chassis 212, such that the fixed segment 2144b1 is fixed to the chassis 212.

In some embodiments, the fastening element 216 includes a fastening component such as a bolt, a screw, or a rivet, but the disclosure is not limited in this regard. In other embodiments, the manner of fixing the fixed portion 2144b to the chassis 212 is not limited to the above fastening component. The manner of fixing the fixed portion 2144b to the chassis 212 also includes such as hot melting bonding, spot welding, or arc welding, but the disclosure is not limited in this regard.

Reference is made to FIG. 5. In the present embodiment, the base plate 214 further has a reinforcing structure 2142a. The reinforcing structure 2142a is disposed between the fixed portions 2144a and 2144b of the base plate 214 and the through hole P. In this embodiment, the reinforcing structure 2142a is a convex hull. The convex hull is produced by, for example, a stamping process, but the disclosure is not limited in this regard. The reinforcing structure 2142a extends along a direction in which the holes T and the fixed portions 2144a and 2144b are arranged, and the reinforcing structure 2142a is adjacent to the holes T and the fixed portions 2144a and 2144b to reinforce the rigidity of the base plate 214 at which the holes T are formed. Furthermore, the reinforcing structure 2142a is integral with the body portion 2142. In some embodiments, the reinforcing structure 2142a is a convex rib (not shown). The reinforcing structure 2142a is connected to the body portion 2142 of the base plate 214. The reinforcing structure 2142a extends along a direction parallel to the body portion 2142, and the reinforcing structure 2142a is disposed adjacent to the holes T and the fixed portions 2144a and 2144b. In other embodiments, the reinforcing structure 2142a is a metal piece, a reinforcing patch, a bending structure, or the like which can enhance the rigidity of the base plate 214, but the disclosure is not limited in this regard.

With the configuration of the reinforcing structure 2142a, when the fixed portions 2144a and 2144b are deformed to a limit along with the deformation of the chassis 212, the reinforcing structure 2142a on the base plate 214 can further enhance the rigidity of the body portion 2142, so as to prevent the body portion 2142 from being deformed or being bent along with the deformed chassis 212, and to keep the body portion 2142 flat.

Through the above configuration of the base plate 214 having the holes T, the fixed portions 2144a and 2144b, and the reinforcing structure 2142a, the body portion 2142 of the base plate 214 can be kept flat when the base plate 214 is fixed to the chassis 212. The gap G between the circuit board 230 of the touchpad device 200 and the body portion 2142 of the base plate 214 also will not be reduced. Therefore, the pressing operation at a corner of the touchpad device 200 will not be affected.

From the above embodiments of the disclosure, it is apparent that, in the present disclosure, the base plate of the touchpad device has holes for allowing each of the fixed portions of the base plate extends into the corresponding one of the holes. Therefore, when the base plate is fixed to the chassis, only the fixed portion of the base plate is bent upward or downward along with the deformation of the chassis, but the body portion of the base plate is still flat. In this way, a gap between the circuit board and the body portion of the base plate will not be reduced due to the deformation of the chassis and the pressing operation at the corner of the touchpad device can be ensured to be operated normally.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

Secondly, phrases "comprising," "includes," "provided," and the like, used in the context are all open-ended terms, i.e. including but not limited to.

What is claimed is:
1. A touchpad device fixed to a chassis, the touchpad device comprising:

a base plate fixed to the chassis and having a through hole, the base plate comprising:
   a body portion having a plurality of holes;
   a plurality of fixed portions, wherein each of the fixed portions is connected to the body portion and extends into a corresponding one of the holes, and wherein the fixed portions and the body portion form a unitary structure, each of the fixed portions comprising:
      a fixed segment fixed to the chassis; and
      at least one connecting arm connected between and in direct contact with both the fixed segment and the body portion; and
   a reinforcing structure connected to the body portion and disposed between the through hole and the fixed portions.

2. The touchpad device of claim 1, wherein the chassis further has a through area, the touchpad device further comprising:
   a supporting element abutting against the base plate;
   a circuit board abutting against a side of the supporting element located away from the base plate; and
   a substrate abutting against a side of the circuit board located away from the supporting element,
   wherein the substrate is accommodated in the through area of the chassis.

3. The touchpad device of claim 1, further comprising a fastening element, wherein the fixed segment has a fastening hole and the fastening element passes through the fastening hole to fasten the fixed segment to the chassis.

4. The touchpad device of claim 1, wherein the at least one connecting arm is inclined relative to the fixed segment and the body portion.

5. The touchpad device of claim 1, wherein a number of the at least one connecting arm is plural, and the connecting arms surround the fixed segment.

6. The touchpad device of claim 1, wherein a number of the holes is two, and the two holes are disposed at two opposite sides of the fixed segment respectively.

7. The touchpad device of claim 1, wherein the holes surround the fixed segment.

8. The touchpad device of claim 1, wherein the reinforcing structure extends along a direction parallel to the body portion.

9. The touchpad device of claim 8, wherein the reinforcing structure is a convex hull that is integral with the body portion.

10. The touchpad device of claim 8, wherein the fixed portions are arranged along a longer side edge of the base plate.

\* \* \* \* \*